United States Patent [19]

Ziemba

[11] 4,116,344
[45] Sep. 26, 1978

[54] FLUID PALLET AND A METHOD OF STACKING AND STORING GOODS

[76] Inventor: Theodore J. Ziemba, 806 W. 17th St., Hastings, Nebr. 68901

[21] Appl. No.: 716,613

[22] Filed: Aug. 23, 1976

[51] Int. Cl.² .............................................. B65G 1/14
[52] U.S. Cl. ................................. 214/10.5 D; 105/468; 108/51.3; 206/522; 248/346; 214/152
[58] Field of Search ...................... 214/10.5 D, 10.5 R, 214/152; 105/468; 206/522, 585; 248/346; 108/51.1, 51.3, 53.1, 152

[56] References Cited

U.S. PATENT DOCUMENTS

| 2,256,024 | 9/1941 | Hill .................................. 214/10.5 R |
| 2,449,591 | 9/1948 | Couse ................................... 206/522 |
| 2,874,826 | 2/1959 | Matthews ......................... 105/469 X |
| 3,044,608 | 7/1962 | Bachleder ............................. 206/522 |
| 3,095,987 | 7/1963 | Sable ........................... 214/10.5 D X |
| 3,263,830 | 8/1966 | Anderson ......................... 214/10.5 R |
| 3,462,027 | 8/1969 | Puckhaber ....................... 206/522 X |

Primary Examiner—Drayton E. Hoffman
Assistant Examiner—George F. Abraham
Attorney, Agent, or Firm—Henderson, Strom, Sturm, Cepican & Fix

[57] ABSTRACT

A fluid inflatable, elongated, flexible, substantially parallel pair of tubes for supporting goods above a surface and a method of stacking and supporting goods on a surface and on top of goods by use of said tubes, wherein upon inflating the tubes, a fork lift truck or the like can be used to lift and move the goods; upon deflating the tubes, less space is required for storing the goods after they have been stacked, and upon partial deflation of the tubes, both a cushioning effect and a space saving effect is obtained.

9 Claims, 5 Drawing Figures

FLUID PALLET AND A METHOD OF STACKING AND STORING GOODS

BACKGROUND OF THE INVENTION

Goods stacked in warehouses and transported in trucks, ships, and airplanes are normally placed on pallets made of wood or metal. The deck of the pallet is normally spaced above the surface of the ground by parallel runners such as 2 × 4 inches placed on an end. The area between runners is required to permit the finger of a fork on a fork lift truck to engage the bottom of the deck for lifting and moving the pallet with the goods, thereon.

The pallets are heavy and occupy a considerable space. On a truck, ship or airplane maximum utilization of the cargo held is a desirable feature. Furthermore, the weight of the pallet creates an unnecessary shipping expense for the shipper. After the goods have been removed from the pallet, a problem of storage or disposal arises. The pallet may either be returned to the shipper, utilized to ship other goods, or destroyed. The cost of storage or disposal is a necessary cost of doing business and any improvement in lightening the weight of the pallet or improving the method of stacking and supporting goods is desirable.

SUMMARY OF THE INVENTION

This invention relates to a fluid inflatable pallet, formed from a flexible lightweight material, that is easily stored in a deflated position, but which upon inflation is capable of supporting goods or a deck on which goods are stacked. In use, several tiers of goods with pallets may be stacked in an area, and by deflating the pallets, an additional tier can be stacked on top thereof. After the goods are removed and the pallet deflated, it can be returned to the shipper or stored. In addition, a partial deflation or full inflation of the pallets with goods disposed thereon provides a cushion for the goods which substantially reduces losses due to breakage and damage.

Additionally, this invention relates to a method of storing goods wherein fluid inflatable pallets are utilized, thus, providing an improved method of handling and storing goods.

It is therefor an object of this invention to provide an improved fluid pallet.

Another object of this invention is the provision of an improved method for supporting goods by the use of a fluid pallet.

A further object of this invention is to provide a fluid pallet which is economical of manufacture, light in weight, easily reusable, durable of construction and extremely effective in use.

It is yet a further object of this invention to provide an improved method for handling and storing goods by using a fluid pallet wherein there is a maximum use of space in a storage area, the goods stored on pallets are cushioned to protect them from breakage and damage, and the stacks of goods are extremely stable, thus preventing accidental or negligent tipping thereof.

These objects and other features and advantages of the invention will become more readily apparent upon reference to the following description when taken in conjunction with the accompanying drawings.

BRIEF DESCRIPTION OF THE DRAWINGS

In the drawings, as hereinafter described, a preferred embodiment of this invention is illustrated; however, various modifications can be made thereto without departing from the true spirit and scope of the invention.

DESCRIPTION OF THE PREFERRED EMBODIMENTS

Figure 2:
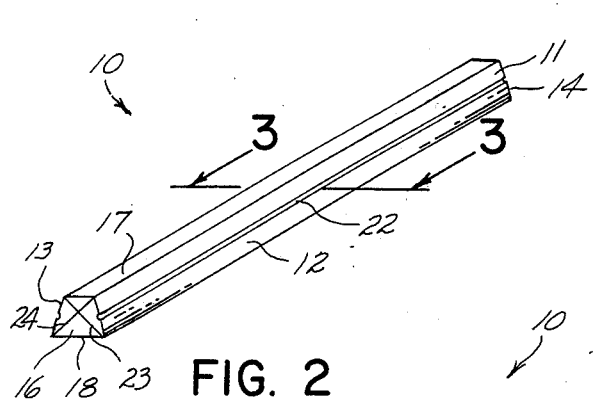
FIG. 2 is a perspective view showing the rear end, top and left side of a single, inflated, fluid pallet.
Figure 4:
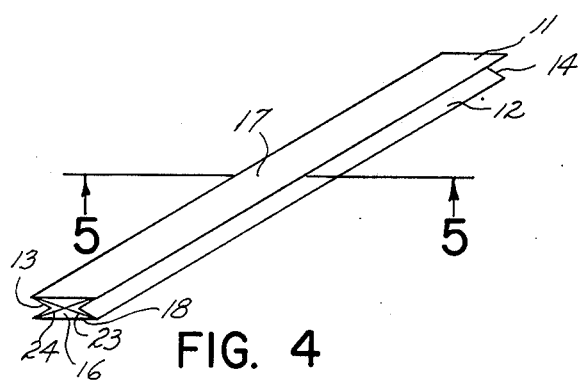
FIG. 4 is a perspective view showing the rear end, top and left side wall of a single, substantially deflated, fluid pallet.

Referring now to the drawings, a fluid pallet of this invention is generally disclosed at 10 in FIGS. 2 and 4. The pallet is formed from a flexible, elongated, fluid tight inflatable tube 11 in the shape of a hexahedron when in an inflated condition. The tube 11 has a pair of side walls 12 and 13, a pair of end walls 14 and 16, a top wall 17, and a bottom wall 18. Both of the end walls 14 and 16 are identical, however, a conduit 19 is connected to the front wall 14 and provides fluid communication to the interior of the tube. A conventional valve 21 is disposed in the conduit 19 to prevent escape of fluid from the tube.

Figure 3:
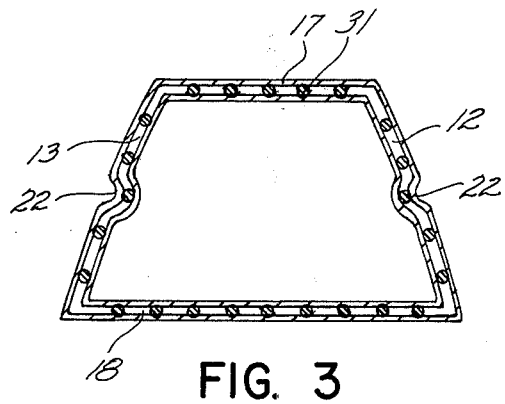
FIG. 3 is an enlarged sectional view taken along the lines 3—3 in FIG. 2.

Each side wall 12 and 13 (FIGS. 2 and 3) has a score line 22 formed longitudinally thereon from end wall to end wall and substantially midpoint between the top and bottom walls. Score lines 23 and 24 are also formed in the end walls from corner to opposing corner, diagonally. The score lines 22, 23 and 24 are provided to assist in the uniform collapsing or positioning of the end walls and side walls as the tube is deflated.

Figure 1:
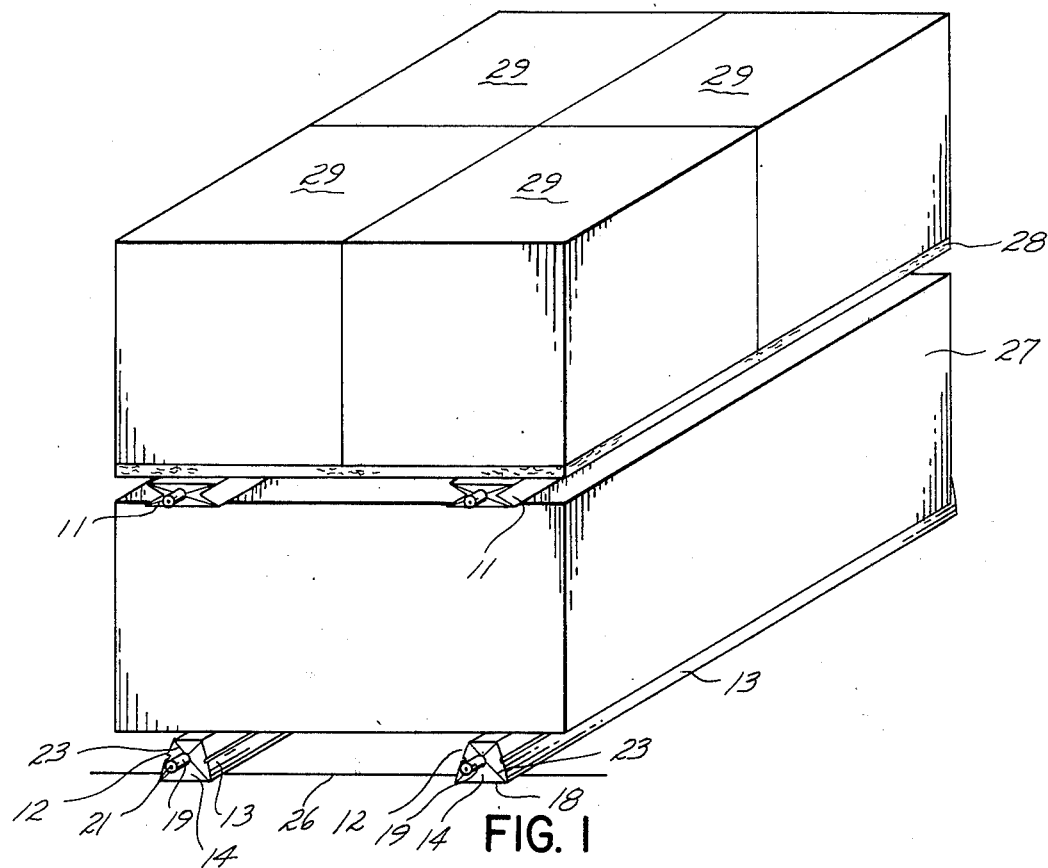
FIG. 1 is a perspective view of one embodiment of the fluid pallets of the invention in a fully inflated and in a substantially deflated configuration with goods stored thereon.

Normally, at least two tubes 11, disposed parallel to each other, are horizontally positioned on a surface 26. Goods 27 are then disposed on the tubes 11 which are either in a deflated or inflated condition. If the goods 27 are handled by a fork lift truck (not shown), then it will be necessary to inflate the tubes to release the fingers of the lift from the goods. If the goods 27 are not utilized as shown in FIG. 1, a deck or platform 28 can be disposed on at least two tubes 11 and then a plurality of individual boxes 29 or the like can be stacked thereon.

Figure 5:
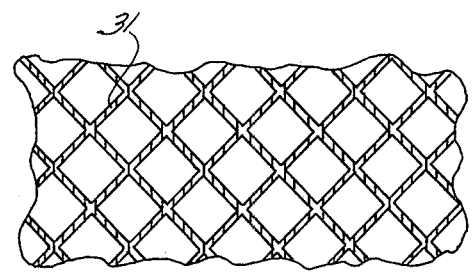
FIG. 5 is an enlarged partial sectional view of the reinforcing used in forming a pallet taken along the lines 5—5 in FIG. 4.

If extremely heavy goods are to be stacked on the tubes 11, then it may be desirable to provide reinforcing 31 (FIGS. 3 and 5) or the like which is sandwiched in or made part of the walls.

The method of use of the fluid pallets is as follows: A pair of tubes 11 are placed in parallel position on a surface, the tubes 11 are inflated by introducing air or liquid into the tubes 11 through the conduits 19, by passing through the valves 21; goods 27 are then placed on the tubes as shown in the lower portion of FIG. 1; additional tubes 11 are then placed on top of the first goods 27; the additional tubes are inflated; and second goods 28 and 29 are then stacked on the additional tubes. The tubes 11 are then either partially deflated or fully deflated. A partial deflation provides a cushioning effect as the goods are supported by a fluid. If a number of tiers of goods are to be stacked on top of each other, a considerable saving of space can be accomplished. In fact, if the average tube is 4 inches high and goods are stacked six tiers high, the savings in space would be approximately 24 inches and a seventh tier could be added and removed while the lower tubes are deflated.

To remove the goods from the tubes by a fork lift truck, it is necessary to inflate the tubes to permit the fingers of the lift to engage the bottom surface of the goods.

If the tubes are to be deflated for a considerable length of time, the inner surface of the tubes should be sprayed with a release agent such as a powder before delation to prevent the walls from sticking together.

After use, and deflation, the tubes can be readily be stored for later use or shipped back to the point of origin of the goods at very little expense.

I claim:

1. A pallet comprising:
   at least two parallel elongated inflatable, flexible tubes;
   each tube being formed with side walls, end walls, a top wall and a bottom wall and is hexahedronally shaped in a cross-sectional view which is transverse to the longitudinal axis of the tube; a conduit being fluidly connected to each tube;
   each conduit having a valve mounted therein for permitting the passage of fluid therethrough, thus allowing said tube to be inflated and deflated; and
   a rigid support member disposed on said tubes for receiving goods thereon, said tubes spaced apart to form a passage therebetween extending the length of said tubes.

2. A pallet comprising:
   at least two parallel elongated inflatable, flexible tubes;
   each tube having a conduit fluidly connected thereto;
   each conduit having a valve mounted therein for permitting the passage of fluid therethrough, thus allowing said tube to be inflated and deflated;
   a rigid support member disposed on said tubes for receiving goods thereon;
   each said tube is hexahedronally shaped having side walls, end walls, a top wall and a bottom wall; and
   each said side wall having a score line formed therein from end wall to end wall to permit said tube to deflate in a uniform manner.

3. A pallet as defined in claim 2 wherein each said end wall has a diagonally extending score lines formed therein from opposing corners.

4. A pallet as defined in claim 3 wherein each said score line in said side wall is disposed substantially at a midpoint between said top wall and said bottom wall and in a deflated position, said side walls are disposed between said top and bottom walls and folded along said side wall score line.

5. A pallet as defined in claim 4 wherein said walls in an inflated position are disposed substantially 90° from adjacent walls.

6. A method for supporting goods above a surface with a fluid pallet formed from at least two elongated inflatable, flexible tubes, with each tube having a conduit fluidly connected thereto and each conduit having a valve mounted therein to allow said tube to be inflated and deflated; and a rigid support member disposed on said tubes for receiving goods thereon, the method comprising:
   (a) placing at least two elongated, inflatable, flexible tubes in substantially parallel and spaced apart relation on a surface;
   (b) inflating said tubes with a fluid;
   (c) placing first goods on said inflated tubes by the use of a fork lift having a hoisting means and fingers for supporting said first goods;
   (d) lowering the fork lift fingers between said inflated tubes until such goods are fully supported by said inflated tubes;
   (e) removing said fork lift fingers from beneath the first goods; and
   (f) partially deflating said inflated tubes.

7. A method for supporting goods as defined in claim 6 and further including the following steps:
   (g) repeating the above steps (a) through (f) with second goods wherein said first goods provide the surface required in step (a).

8. A method for supporting goods as defined in claim 7 and further including the following steps:
   (h) inflating said tubes supporting said second goods with a fluid;
   (i) inserting fork lift fingers between said second goods and said first goods;
   (j) raising said fork lift fingers to thereby raise said second goods above said inflated tubes; and
   (k) removing said second goods from proximity with said first goods.

9. A method for supporting goods as defined in claim 8 and further including the repetition of steps (h) through (k) with said first goods instead of said second goods.

* * * * *